Dec. 24, 1968    B. R. BEAVERS ET AL    3,418,546
MOMENTUM TRANSDUCER
Filed Nov. 25, 1966

BOBBY R. BEAVERS
NORMAN J. MEYER

BY H.C. Goldwire

AGENT

3,418,546
MOMENTUM TRANSDUCER

Bobby R. Beavers, Garden Grove, and Norman J. Meyer, Costa Mesa, Calif., assignors, by mesne assignments, to Ling-Temco-Vought, Inc., Dallas, Tex., a corporation of Delaware
Filed Nov. 25, 1966, Ser. No. 597,036
8 Claims. (Cl. 317—246)

ABSTRACT OF THE DISCLOSURE

A capacitive momentum transducer is provided with a rigid plate supported resiliently from a central portion thereof and adjacent a conductive backplate. A conductive portion of the plate is adjacent but electrically isolated from the backplate such that capacitance is formed therebetween. Particles which impinge upon the plate cause a displacmeent of the plate toward the backplate such that a detectable variation of capacitance between the backplate and conductive portion occurs, the variation being proportional to the momentum of the particle regardless of its point of impingement.

---

The invention described herein was made in the performance of work under a NASA contract and is subject to the provisions of section 305 of the National Aeronautics and Space Act of 1958, Public Law 85–568 (72 Stat. 435; 42 U.S.C. 2457).

This invention relates to a momentum transducer and more particularly to such a transducer wherein momentum imparted to the transducer is detectable by a variation of an electrical capacitance thereof.

In accordance with the invention there is provided a structure having a backplate, a rigid mass element, and a suspension for supporting the rigid mass element adjacent the backplate, so that momentum imparted to the mass element is detectable by variation of the capacitance of the backplate and the mass element.

An apparatus which has previously been used to detect the impact of particles such as meteor particles is the condenser microphone. When a particle strikes the conductive membrane of the microphone, the membrane moves relative to a conductive plate, changing the capacitance between membrane and plate. The change in capacitance is converted by a circuit to an electrical signal indicating the impact of the particle. The signal does not, however, accurately indicate the momentum of each particle detected. A particle striking near the edge of the membrane where it is supported gives rise to a different membrane deflection and therefore a different electrical signal than one of the same momentum striking near the center of the membrane. The latter effect is largley due to the increased resistance of the membrane to motion at points away from its center. This difference in output signal due to different impact locations could be diminished by masking the membrane from impacts except near the center, but it is often undesirable to utilize so little of the area occupied by the instrument in the plane of particle impacts.

Accordingly, it is a major object of the invention to measure the momentum of impacting particles.

Another object is to measure the momentum of particles received in an area independent of where the particles impact within this area.

A further object of the invention is to provide a transducer for accurately measuring the momentum of particles received in all parts of a detecting area, which area utilizes most of the space occupied by the transducer in the plane of particle impacts.

Other objects and advantages will be apparent from the specification and claims and from the accompanying drawing illustrative of the invention.

Figure 1:
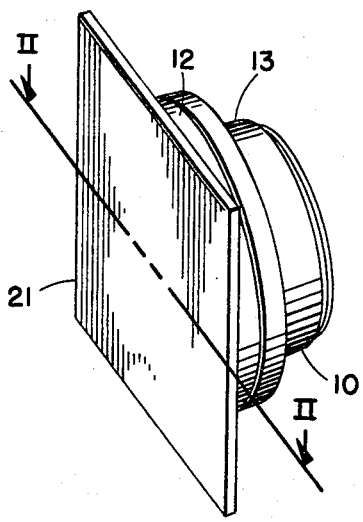
FIGURE 1 is a pictorial view of a momentum transducer according to the invention.
Figure 2:
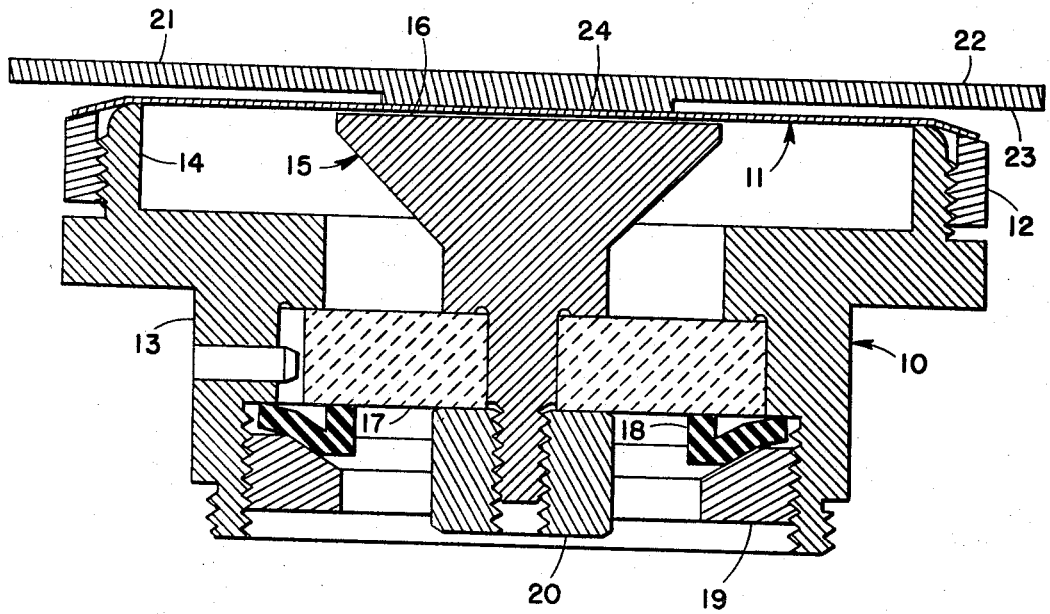
FIGURE 2 is a vertical sectional view of the transducer of FIGURE 1, taken in the plane established by line II—II of FIGURE 1.

Referring now to the drawing, there will be described a preferred embodiment of the invention. The momentum transducer shown in FIGURES 1 and 2 is generally referred to by the reference numeral 10. Transducer 10 has a circular, conductive membrane 11 attached to a threaded ring 12 at the periphery of the membrane, as by cementing. The membrane is preferably made of aluminum foil and approximately 0.0005 inch thick. Ring 12, for example made of stainless steel, is threadedly engaged with a housing 13 of the same material. It often is preferable to make both the membrane 11 and ring 12 of the same materials, especially where a same rate of thermal expansion is an important factor. Housing 13, which has a circular opening 14 therein, bears against the membrane 11 so that it supports the membrane at the periphery of opening 14.

Mounted in fixed relation to housing 13 is backplate 15, situated at the opening 14. Backplate 15, preferably made of stainless steel, has a plane, circular surface 16 concentric with the opening 14. Because of its stainless steel construction, backplate 15, including surface 16, is electrically conductive. Supporting the backplate 15 and insulating it from housing 13 is an annular quartz insulator 17. Washer 18 supports quartz insulator 17 and in turn is supported by an annular ring 19 threadedly engaged with housing 13. Threaded section 20 secures backplate 15, while making electrical contact thereto.

Transducer 10 has as a mass element a plate 21. As shown by FIGURE 1 and FIGURE 2, plate 21 is basically in the shape of a rectangular solid with a square surface 22 larger than the opening 14. Extending from surface 23, opposite surface 22, is a portion of plate 21 which is cylindrical in shape, having a plane, circular surface 24 centered relative to the surfaces 22 and 23 and parallel thereto. Plate 21 is preferably constructed of aluminum, or it may be of another metal, or a ceramic material, etc.: it need not be conductive.

Membrane 11 is rigidly attached to the cylindrical portion of plate 21, as by cementing to the circular surface 24 thereof and thus, in the area of attachment, becomes a part of and forms a conductive surface on the mass element. The surface 24 is mounted concentric with the surface 16 of backplate 15, and because of the suspension by membrane 11, the surfaces are parallel. As shown in FIGURE 2, the diameter of surface 24 is smaller than that of surface 16. Both surfaces are substantially smaller than the opening 14. The surface 16 of backplate 15 is separated from the adjacent conducting surface by approximately 0.005 inch.

Electrical contact may be made with the capacitor of transducer 10 by conductively engaging the threads of section 20 for one lead and engaging the threads of the housing 13 for the other lead at a location outside the place where ring 19 is engaged. Of course, other arrangements are possible as long as one lead is electrically connected to the conductive surface 16 of backplate 15 and the other is connected to the conductive surface of membrane 11 opposite surface 24 on plate 21.

In the operation of transducer 10, particles, for example meteor particles, strike plate 21 traveling in the direction shown as downward in FIGURE 2. The momentum imparted to the plate 21 by a particle moves the plate toward backplate 15, increasing the electrical capacitance between membrane 11 and backplate 15. The change in capacitance is detected by a high impedance circuit connected to the electrical leads of transducer 10 to apply a polarizing voltage to the capacitor formed by the membrane 11 and backplate 15. The polarizing voltage places a charge on the capacitor. When the capacitance is changed, the charge on the capacitor is prevented from quickly changing by the high impedance of the circuit connected to the transducer. Therefore, the voltage at the leads of the capacitor changes in proportion to the change in capacitance. The voltage change is amplified for recording and display. Since the foregoing circuit functions are required in the operation of a condenser microphone, a condenser microphone circuit may appropriately be the one connected to the leads of transducer 10 to detect the change in capacitance thereof.

For the transducer 10, there is an accurate relationship between the voltage at its leads and the momentum of an impacting particle. The magnitude of the voltage generated per unit of received momentum (for example, in volts/dyne sec.) is given by S, $$S = \frac{E_0}{2\pi d_0 (kM)^{1/2}}$$

where $E_0$ is the polarizing voltage applied,
$d_0$ is the separation of the capacitor plates at rest,
$k$ is the spring constant of the suspending membrane 11,
M is the mass of plate 21 and that part of membrane 11 overlying surface 24.

Transducer 10 detects the momentum of an impacting particle regardless of where the particle strikes the surface 22 of plate 21. It is the component of momentum in the direction perpendicular to surface 16 which the transducer detects, and a striking particle imparts to plate 21 a translational motion in that direction which does not depend on the point of impact, because plate 21 is a rigid body. This translational motion gives rise to the change in the capacitance of the parallel-plate capacitor formed by membrane 11 and backplate 15, which change is detected by the external circuit as a measure of particle momentum. Additionally, if the particle strikes other than at the middle of the surface 22, there is imparted to plate 21 an angular motion added to the translational motion. In its angular motion, the plate 21 will move toward surface 16 on one side of the center thereof and away from surface 16 on the other side. Such motion does not result in a change of capacitance, however, since an increased separation of the capacitor plates at, say, the left side of FIGURE 2, is offset by a decreased separation on the right side. Therefore, it is only the translational motion, which is independent of impact position, that produces an output signal.

The structural feature which gives rise to equal translational motion of plate 21 independent of impact position is its rigidity. The contrast between the response of such a mass element and that of a membrane is apparent. Moreover, it is partly the rigidity of plate 21 which eliminates a change in capacitance due to the angular motion of the plate; that is, the lower surface of plate 21 remains flat while in angular motion, making possible a displacement on one side which completely offsets a displacement on the other side. Further contributing to the elimination of capacitance changes from rotational motion is the symmetrical distribution of mass in plate 21. The material of plate 21 is of uniform density, and the shape of the plate is symmetrical about the line perpendicular to circular surface 24 at its center. Therefore, the mass is distributed symmetrically about the line. Of course, the line also passes through the center of circular surface 16, concentric with surface 24. With such a distribution, if mass element plate 21 is symmetrically suspended by a resilient element, it will move in its angular motion about a line parallel to surfaces 22 and 24 and intersecting the previously described symmetry line. The symmetrical, resilient suspension of plate 21 is provided by membrane 11 in exerting spring forces on the plate which are symmetrical about the described line of symmetry through the center of surfaces 24 and 16. The angular motion resulting from the symmetrical suspension of plate 21 is the one desired wherein a change in capacitor plate separation on one side of the symmetry line is offset by an opposite change on the other side. Of course, to obtain no change in capacitance with such motion, the surfaces 24 and 16 should each be symmetrical about a common line, as in transducer 10.

Thus, it is seen that transducer 10 provides for the measurement of particle momentum independent of the impact position on surface 22. Moreover, the useful particle detecting area is not limited to a minor part of the area occupied by the transducer; rather, the useful area comprises the whole of surface 22.

While only one embodiment of the invention, together with modifications thereof, has been described in detail herein and shown in the accompanying drawing, it will be evident that various further modifications are possible in the arrangement and construction of its components without departing from the scope of the invention.

We claim:

1. In a momentum transducer, the structure comprising:
    a conductive backplate;
    a rigid mass element having a conductive surface; and
    means for resiliently and pivotally suspending said mass element in relation to the backplate, from a central portion of said mass element and with said conductive surface disposed adjacent, electrically isolated from, and in spaced relation to said backplate, said mass element having a peripheral portion radially outside said central portion and spaced from said suspension means, whereby momentum imparted to said mass element is detectable by variation of the electrical capacitance of said backplate and said mass element.

2. The structure set forth in claim 1, wherein said means for suspending is a means for suspending said mass element to move symmetrically relative to said backplate.

3. In a momentum transducer, the structure comprising:
    a backplate having a plane, electrically conductive surface;
    a rigid mass element having a central boss which has a plane, electrically conductive surface electrically isolated from the backplate conductive surface, said mass element having a peripheral portion radially outside said boss; and
    means attached to said boss at said conductive surface and spaced from said peripheral portion for symmetrically, resiliently, and pivotally suspending said mass element in relation to said backplate to position said conductive surface of said boss adjacent to and spaced from said surface of said backplate, thereby to form a momentum-variable capacitor.

4. The structure set forth in claim 3, wherein said surface of said backplate is symmetrical about a point therein and the mass of said rigid mass element is distributed symmetrically about a line through said point, said line further being an axis of symmetry for the suspending forces exerted by said means, and wherein said surface of said backplate is parallel to said surface of said boss.

5. The structure set forth in claim 4, further including a housing fixed relative to said backplate and having a circular opening therein, and wherein said suspending means includes a membrane supported by said housing at the periphery of said opening and symmetrically attached to said mass element.

6. The structure set forth in claim 5, wherein said mass element has another plane surface parallel to said plane conductive surface thereof and larger than said circular opening.

7. In a momentum transducer, the structure comprising:
   a mass element plate;
   a housing having a circular opening therein smaller than the plate;
   a conductive backplate fixed relative to said housing and situated at said opening; and
   a conductive membrane supported by said housing at the periphery of said opening and attached to one side of said mass element plate at points removed from the perimeter of said plate to suspend said plate adjacent said backplate, whereby momentum imparted to said mass element plate is detectable by variation of the electrical capacitance of said membrane and said backplate.

8. A momentum transducer comprising:
   a conductive backplate having a plane, circular surface;
   a rigid, conductive mass element having a rectangular, solid portion with an outer surface and a cylindrical portion extending from the side of said rectangular solid portion opposite said outer surface, said cylindrical portion having a plane, circular surface parallel with and centered relative to said rectangular surface,
   a housing fixed relative to said backplate and having a circular opening therein concentric with said circular surface of said backplate, and
   a resilient, conductive membrane supported by said housing at the periphery of said opening, said membrane being symmetrically and rigidly attached to said cylindrical portion of said mass element to suspend said circular surface thereof adjacent to and parallel with said circular surface of said backplate, whereby momentum imparted to said mass element is detectable by variation of the electrical capacitance of said backplate and said membrane.

References Cited

UNITED STATES PATENTS

| | | | |
|---|---|---|---|
| 2,452,799 | 11/1948 | Speaker | 317—246 |
| 2,632,791 | 3/1953 | Side | 317—249 |
| 3,027,769 | 4/1962 | Coon | 317—246 |
| 3,307,407 | 3/1967 | Berg | 317—246 X |

LEWIS H. MYERS, *Primary Examiner.*

ELLIOT GOLDBERG, *Assistant Examiner.*

U.S. Cl. X.R.

73—432